United States Patent
Carney et al.

(10) Patent No.: US 8,745,708 B2
(45) Date of Patent: Jun. 3, 2014

(54) METHOD AND APPARATUS FOR IMPLEMENTING SECURITY MEASURES ON NETWORK DEVICES

(75) Inventors: Mark D. Carney, Sterling, VA (US);
Theresa A. Menzel, Manassas, VA (US);
Jeffrey A. Jackson, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 560 days.

(21) Appl. No.: 12/972,053

(22) Filed: Dec. 17, 2010

(65) Prior Publication Data

US 2012/0159586 A1    Jun. 21, 2012

(51) Int. Cl.
G06F 7/04    (2006.01)

(52) U.S. Cl.
USPC .......................................................... 726/6

(58) Field of Classification Search
USPC ............. 726/6, 7, 10, 11, 27, 28, 29; 713/185
See application file for complete search history.

(56) References Cited

U.S. PATENT DOCUMENTS

| | | | |
|---|---|---|---|
| 6,324,648 B1 * | 11/2001 | Grantges, Jr. ................... 726/12 |
| 8,286,241 B1 * | 10/2012 | Yeo et al. ......................... 726/22 |
| 2005/0166053 A1 * | 7/2005 | Cui et al. ....................... 713/176 |
| 2009/0147700 A1 * | 6/2009 | Sewall et al. ................... 370/254 |
| 2011/0197281 A1 * | 8/2011 | Alme et al. ...................... 726/24 |
| 2011/0235549 A1 * | 9/2011 | Ahlers et al. ................... 370/255 |
| 2011/0283356 A1 * | 11/2011 | Fly et al. .......................... 726/22 |
| 2011/0283359 A1 * | 11/2011 | Prince et al. ..................... 726/23 |
| 2012/0023558 A1 * | 1/2012 | Rafiq ................................ 726/6 |
| 2012/0036576 A1 * | 2/2012 | Iyer ................................. 726/23 |
| 2012/0151559 A1 * | 6/2012 | Koudys et al. .................... 726/3 |

* cited by examiner

Primary Examiner — Brandon Hoffman

(57) ABSTRACT

A method for providing security measures on a network device, such as a router, is disclosed. In one embodiment, a method includes receiving a request for a network resource. The method further includes determining a classification of the request, and generating, based on the determined classification of the request, a security measure corresponding to the determined classification of the request for authentication of the request. The method also includes permitting access to the network resource when a correct response is received to the security measure corresponding to the determined classification of the request.

21 Claims, 5 Drawing Sheets

METHOD AND APPARATUS FOR IMPLEMENTING SECURITY MEASURES ON NETWORK DEVICES

BACKGROUND

A typical residential or commercial networking system allows computers, components, and other types of network devices connected to a network to share resources between the devices. Generally, the networking system utilizes a networking device, such as a router, to provide routing and forwarding of information between the various devices in the network. For example, the router may perform packet handling for devices connected to the network by matching packet addresses between the devices.

In addition to routing information between the devices, the router also typically includes an administrative page providing the ability to configure various configuration settings for the router. Such configuration settings may include security settings such as a password required to access the network, a password to obtain access to the administrative page, and additional security features that function to prevent unauthorized users from accessing the networking system. Typically, wireless and wired applications include an access key, such as a password or a combination of passwords, required for accessing the network. The access key allows the host to recognize the device (or user) such that access to the networking system may be granted.

A security concern arises when operating in either a wireless environment or a wired environment. The potential for unauthorized access by a physical connection (i.e., a wire connecting directly to a router) is limited; however, unauthorized access attempts are possible in a wired environment through malicious code embedded in web sites, viruses, worms, etc. In a wireless environment, access to the networking system may be gained wirelessly despite the presence of spatial distances when operating in a wireless environment. Accordingly, a router's security features may be used to prevent unauthorized access to the networking system.

However, given the difficulty experienced by many computer users in establishing a wireless networking system in a home or office environment, manufacturers who include security features in their routers typically ship these devices with the security features turned off or disabled. Although disabling the security features helps ease connectivity issues related to installation of the router and the various computer components connected to the router in the network, many users do not enable the security features once the system is configured. Other users simply find it difficult to correctly configure the security features, which can result in costly support calls to the manufacturer and less satisfactory user experiences.

Furthermore, typically when a networking router is manufactured, it is preconfigured with a default password for the administrative page. To minimize cost and complexity in manufacturing of such routers, typically the same configuration is installed onto every router for a given production run, and consequently, the same default password is assigned to the administrative page found on the routers. As a result, numerous routers manufactured with the same software and sold to end users will have the same default password for the administrative page. Furthermore, the end user who acquires the router often will not change the default password, or if the password is changed, it is by an installation technician who sets the password to a trivial common password, which can easily be overcome.

While such default or trivial passwords provide customer support centers, technicians, and end users easy access to the administrative page, and thus the configuration settings of the routers, such passwords also present a major security risk for service providers and represent an easy target for hackers, automated bots, or other such unauthorized users who desire to gain access to network systems for malicious purposes.

This disclosure is directed to overcoming one or more of the problems set forth above, as well as other problems in the art.

DETAILED DESCRIPTION

Figure 1:
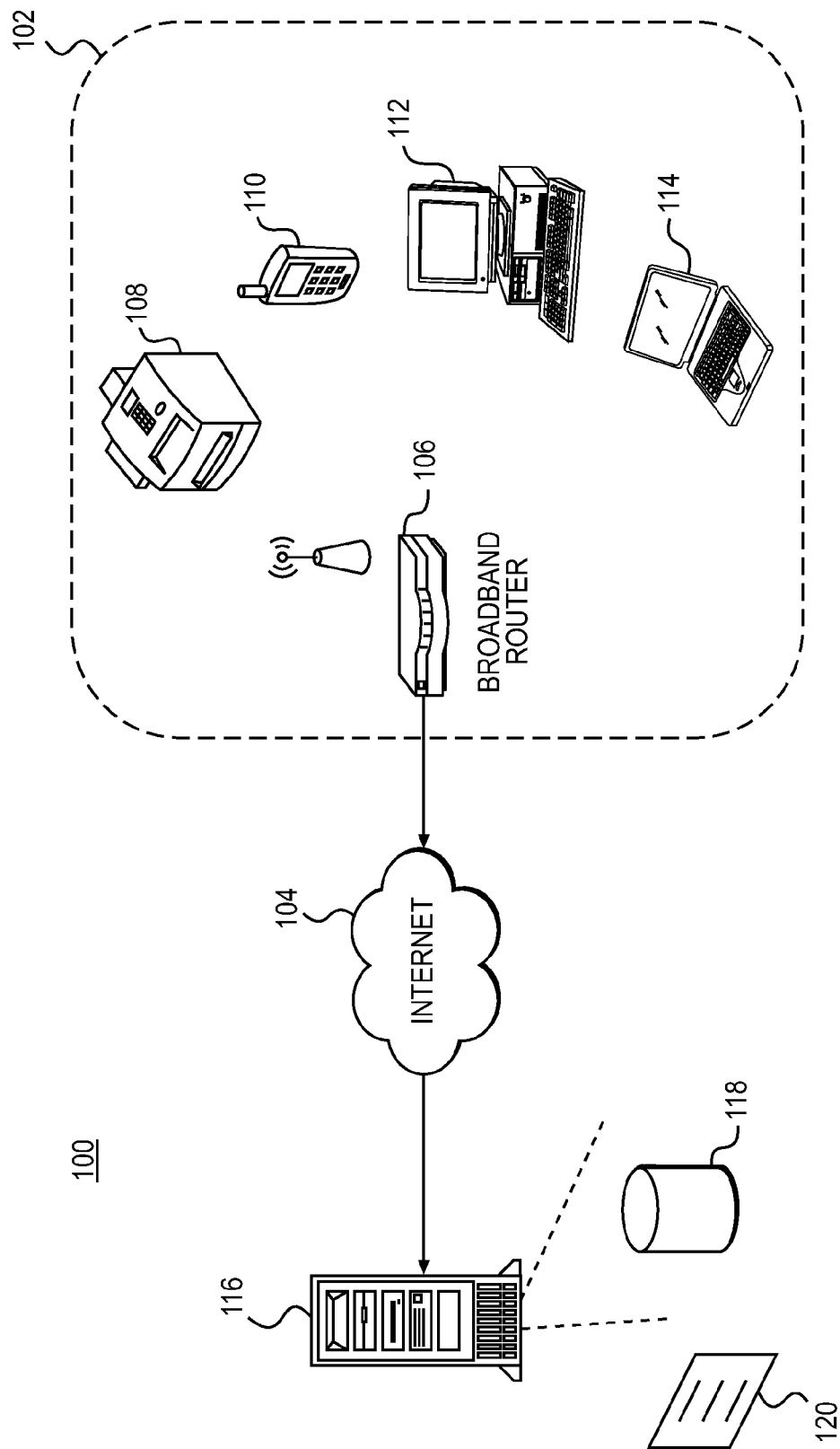
FIG. 1 is a diagram of an exemplary network in which systems and methods consistent with the present disclosure may be implemented.

The following detailed description refers to the accompanying drawings. Wherever possible, the same reference numbers are used in the drawings and the following description to refer to the same or similar parts. While several exemplary embodiments are described herein, modifications, adaptations and other implementations are possible. For example, substitutions, additions or modifications may be made to the components illustrated in the drawings, and the exemplary methods described herein may be modified by substituting, reordering, removing or adding steps to the disclosed methods. Accordingly, the following detailed description is not limiting. Instead, the proper scope is defined by the appended claims.

One aspect of the disclosure relates to a method for providing security measures on a network device, such as a router. The method may include receiving a request for a network resource. The method may further include determining a classification of the request, and generating, based on the determined classification of the request, a security measure corresponding to the determined classification of the request for authentication of the request. The method may also include permitting access to the network resource when a correct response is received to the security measure corresponding to the determined classification of the request.

Another aspect of the disclosure relates to an apparatus. The apparatus may include a memory device storing instructions for processing of incoming requests. The apparatus may further include a processor executing the instructions for performing a method including receiving a request for a network resource. The apparatus may further execute instructions for determining a classification of the request, and generating, based on the determined classification of the request, a security measure corresponding to the determined classification of the request for authentication of the request. The apparatus may further execute instructions for permitting access to the network resource when a correct response is received to the security measure corresponding to the determined classification of the request.

Yet another aspect of the disclosure relates to a computer-readable storage medium storing instructions which, when executed by a processor, causes a computer to perform a method including receiving a request for a network resource. The computer-readable storage medium may further include instructions which, when executed by a processor, cause a computer to perform a method of determining a classification of the request, and generating, based on the determined classification of the request, a security measure corresponding to the determined classification of the request for authentication of the request. The computer-readable storage medium may further include instructions which, when executed by a processor, cause a computer to perform a method of permitting access to the network resource when a correct response is received to the security measure corresponding to the determined classification of the request.

Yet another aspect of the disclosure relates to a computer-implemented method for providing security measures on a network device, such as a router. The method may include receiving a first request and a second request for a network resource. The method may further include determining whether the first request or second request originated from a trusted software application. The method may also include generating, upon determining that the first request originated from a trusted software application, a first security measure for authentication of the first request; and generating, upon determining that the second request did not originate from a trusted software application, a second security measure different from the first security measure for authentication of the second request.

FIG. 1 is a block diagram of a data processing and telecommunications environment 100, in which features and aspects consistent with the present invention may be implemented. The number of components in environment 100 is not limited to what is shown, and other variations in the number of arrangements of components are possible, consistent with embodiments of the invention. The components of FIG. 1 may be implemented through hardware, software, firmware, and/or any combination of these structures.

For the purpose of illustration, environment 100 may include a private data network 102 and a public data network 104. Private data network 104 may include an intranet, a local area network (LAN), a wireless LAN (WLAN), a personal area network (PAN), a home-based network, a wireless PAN, or a combination of networks. Public data network 104 may include one or more private data networks, a wide area network (WAN), a metropolitan area network (MAN), a cellular network, a public switched telephone network (PSTN), the Internet, or any other network or combination of networks.

Private data network 102 may be implemented through any suitable combination of wired and/or wireless communication networks and may provide communications, either by wired connection or wirelessly, via a suitable networking device such as exemplary router 106, between the various network devices of private data network 102, such as printer or other such multi-function printer/fax/scanner/copier device 108, mobile communication device 110, personal computer (PC) 112, and laptop computer 114. Depending on the implementation, private data network 102 may include fewer, additional, or different devices than those illustrated in FIG. 1. Although FIG. 1 shows a single private data network 102, those skilled in the art will appreciate that private data network 102 is only representative in nature and in some implementations may consist of more than one network configuration designed to communicate using various wireless and wired structures and various protocols.

Exemplary router 106 represents a device, including any appropriate controlling logic, capable of receiving, routing, and transmitting packets between network devices 108-114 of private data network 102, and between private data network 102 and public data network 104. To access public data network 104, the packets are transmitted from network devices 108, 110, 112, and 114 to router 106. Router 106, or an intermediary modulator-demodulator (modem) device (not shown) then modulates the data comprising the packets onto a connection and transmits the modulated data via the connection to public data network 104.

Support system 116 may be connected to public data network 104, and may provide data or software applications over public data network 104 to network devices such as router 106, or other network devices utilizing private network 102. In one embodiment, support system 116 is a computer that includes memory and processing components necessary to store information about one or more routers, such as router 106, and one or more configuration scripts for automatically configuring router 106. Support system 116 may also serve as a web server, a DHCP server, or any other network system. Support system 116 may include one or more specialized or general-purpose computing platforms having processing components, memory, and communication interfaces sufficient to interact with and communicate data over public data network 104.

Support system 116 may include database 118 storing information about one or more routers, such as router 106, used or intended to be used in connection with public data network 104. More particularly, database 118 may include one or more router entries including various information about a router that is connected to the public data network 104 or intended to be connected to public data network 104. Such information may include, but is not limited to, a static IP address, a dynamic IP address, a static gateway, a dynamic gateway, a static subnet address, a dynamic subnet address, firewall information, port information, or any other suitable network, connection, protocol, or device information, and may also include any additional information that may be useful to support system 116 in configuring, managing a connection with, or otherwise determining rules for a router such as router 106.

Database 118 may include one or more support applications 120 corresponding to routers defined by the router entries. The support applications may include one or more commands that are executable by a router, such as router 106, for configuring or troubleshooting the router. For example, support application 120 may include commands necessary to configure initial settings or restore default factory settings for the router, such as the firewall rules or the port forwarding rules, as well as security related features of router 106, such as the password for the administrative page. Alternatively, support application 120 may instead include one or more identifiers associated with commands recognizable by router 106 and used to locally execute commands corresponding to such identifiers on the router. Support application 120 may be used by customer support specialists for assistance in resolving issues pertaining to router 106 experienced by an end user of the router.

Router 106 and network devices 108, 110, 112, and 114 may be configured to communicate with support system 116. For example, a client application may be installed on router 106 or network devices 108, 110, 112, and 114, providing the ability to directly communicate with support system 116 via public data network 104 using aspects of TCP/IP including the hypertext transfer protocol ("HTTP"), the user datagram protocol ("UDP"), the file transfer protocol ("FTP"), the hypertext markup language ("HTML"), and the extensible markup language ("XML"). It is to be appreciated that other protocols for communicating over public data network 104 may be used in alternative embodiments.

Figure 2:
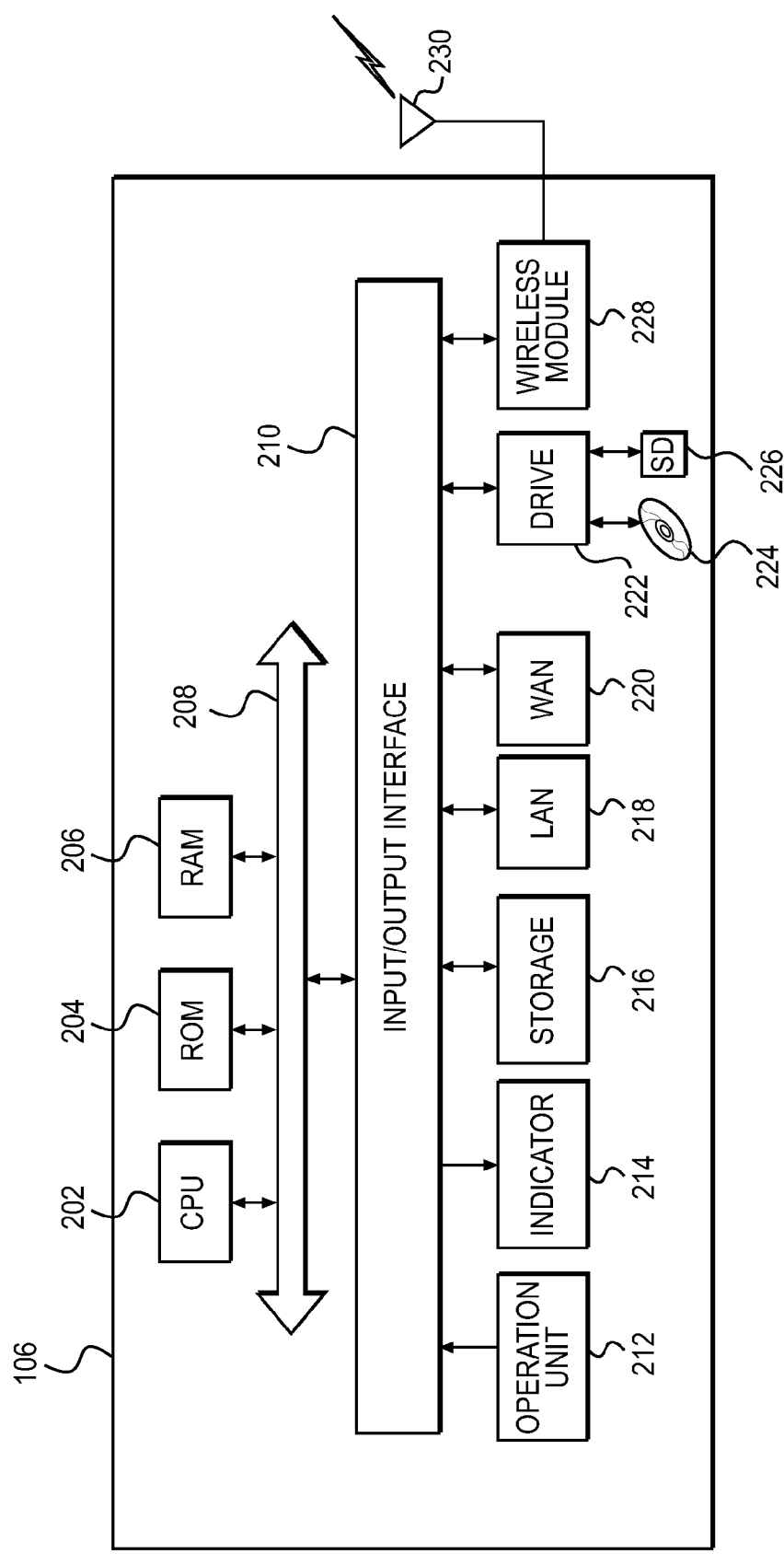
FIG. 2 is a block diagram of an exemplary router from the network, consistent with the present disclosure.

FIG. 2 is a block diagram illustrating the structure of exemplary router 106. As shown, router 106 includes a central processing unit (CPU) 202 coupled to one or more memories, such as ROM 204 and RAM 206. ROM 204 may be a programmable read-only memory (PROM), an erasable programmable read-only memory (EPROM), an electrically erasable programmable read-only memory (EEPROM), flash memory, or any other nonvolatile memory used for storing software applications or data. ROM 204 preserves data when router 106 is powered off. RAM 206 may be dynamic random access memory (DRAM), static random access memory (SRAM), or any other volatile random access memory. CPU 202 may perform a variety of processes in accordance with a program stored in a ROM 204 and loaded into RAM 206. RAM 206 may buffer data that CPU 202 requires to perform a variety of processes. CPU 202, ROM 204, and RAM 206 may be mutually connected through a bus 208. Bus 208 may be connected to an input/output interface 210.

Router 106 may have a number of components connected to input/output interface 210. For example, connected to input/output interface 210 may be an operation unit 212 including buttons and switches for controlling options on router 106, an indicator 214, such as a light emitting diode (LED), a storage 216, such as a hard disk drive (HDD) capable of storing instructions for execution by CPU 202, a local-area network (LAN) communication unit 218 for controlling communications with a personal computer, printer, or other such network-enabled devices, and a wide-area network (WAN) communication unit 220 for enabling communication with a network such as public data network 104.

Connected to the input/output interface 210 may be a drive 222. A computer-readable removable storage disk 224, such as a magnetic disk, an optical disk, a magneto-optical disk, floppy disk, or any other type of removable storage disk may be loaded into drive 222, and a computer program may be read from the storage disk and stored in storage 216. Alternatively, a computer program or other such data may be read from a nonvolatile memory card. For example, a Secure Digital (SD) card 226 may be inserted into drive 222, which may be a memory card reader, for the copying of data to storage 216.

A wireless module 228 may also be connected to input/output interface 210, and may include one or more antennas 230, which receive and/or transmit information from a wireless network, such as private network 102, into or from the router for processing by CPU 202. The driver and/or control software of wireless module 228 may be stored in storage 216 and loaded into RAM 206 for execution by CPU 202, allowing communication with other wireless devices, such as network devices 108, 110, 112, and 114, over private network 102.

Figure 3:
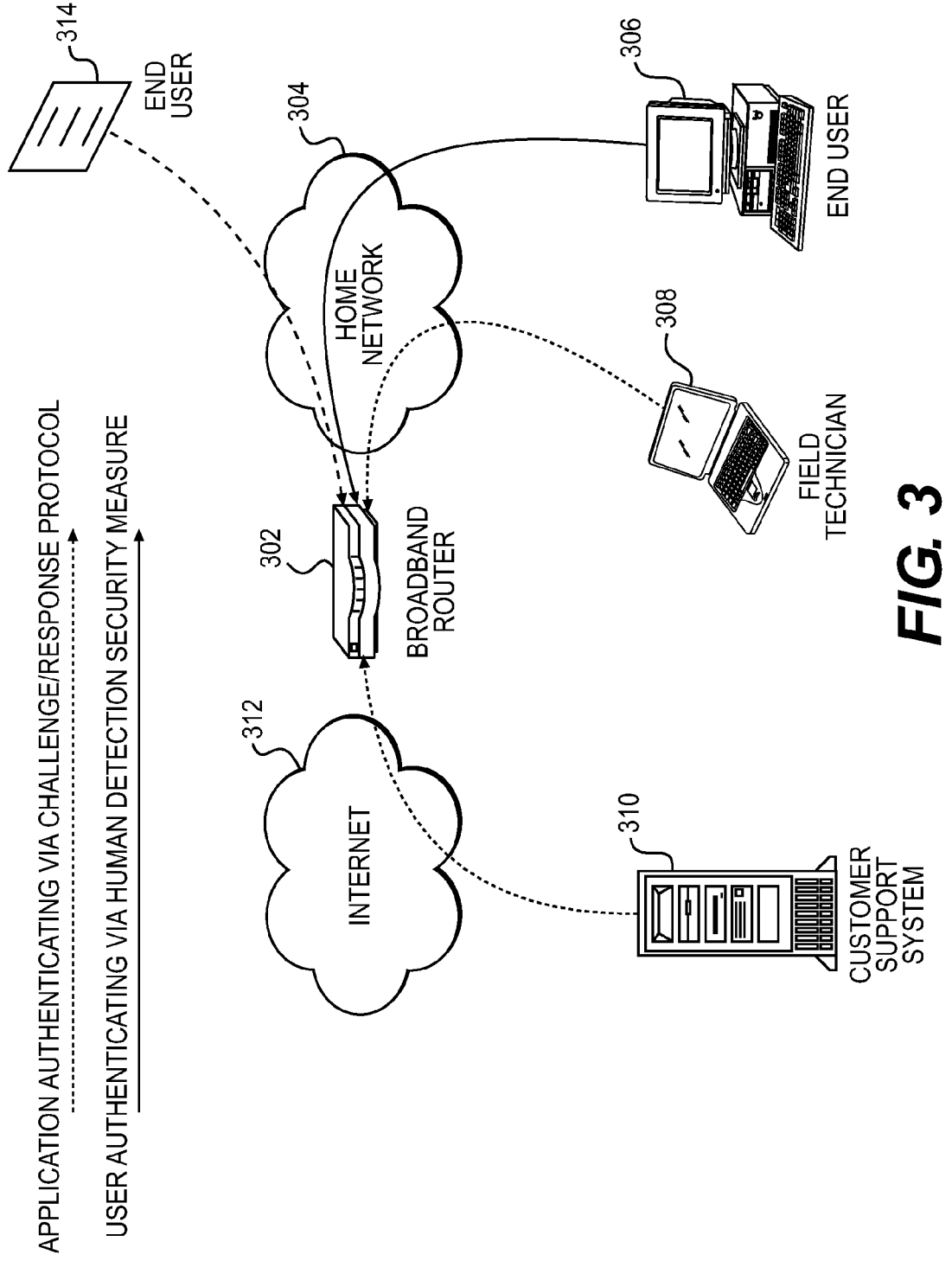
FIG. 3 illustrates how an exemplary router would perform authentication in the network in accordance with certain aspects of the present disclosure.

FIG. 3 is an exemplary diagram providing an overview of combining different methods of authentication with devices attempting to access an exemplary router 302. To prevent unauthorized users from gaining access to a network device, such as router 302, different authentication techniques or security measures may be implemented depending on a classification or type of an incoming request to the router. Specifically, a different authentication technique may be generated or used by router 302 if an incoming request is determined to have originated from an trusted software application, rather than a human end user on a computer system. For example, an incoming request may be determined to have originated from a trusted software application by detecting a user agent of the software application, which may be a textual string or ID value representing the software application. Based on the presence, or lack, of a recognized user agent corresponding to a trusted software application, appropriate security or authentication challenges may be provided responsive to an incoming request attempting to access an administrative page of the networking device, where the security or authentication challenges correspond to the determined classification of the request.

For example, in certain embodiments, router 302 may determine that an incoming request is being received from an end user 306 via a private home network 304. Specifically, end user 306 may request access to the administrative page of router 302 via a web browser running on a computer system. Router 302 may therefore determine, based on the user agent of the software application, that the incoming request is coming from an end-user browser. As the end-user browser is not recognized as a trusted software application by router 302, a human detection security measure may be generated for authentication purposes and presented to end user 306.

In certain embodiments, the human detection security measure may be a challenge response mechanism designed to differentiate between automated bots and human users, typically known as a Turing test. For example, one such Turing test may be a Completely Automated Public Turing test to tell Computers and Humans Apart (CAPTCHA). A CAPTCHA is a graphic that has a meaning decipherable only to a human being. The graphic is typically a word and/or series of alphanumeric characters that are skewed in alignment or perspective, dispersed among arbitrary markings, displayed over a distracting background, etc., such that optical character recognition techniques cannot determine the exact words and/or characters used in the graphic. Thus, router 302 may present a CAPTCHA to end user 306, requesting entry of the words and/or characters presented in the CAPTCHA. Once the correct combination of words and/or characters is entered, the human detection security measure is satisfied, and end user 306 is granted access to the administrative page of router 302.

It is to be appreciated that the human detection security measures are not limited to text-based CAPTCHA challenges, but may include any number of challenges designed to implement a Turing test. For example, a system may utilize a photographic challenge, or image recognition CAPTCHA, whereby a user is presented with a grid of random pictures and the user is instructed to click on a specific picture, or there may be a requirement that a user depress a specified key or combination of keys in response to an auditory instruction.

Alternatively, router 302 may determine that the incoming request originated from a software application included in a list of trusted software applications. For example, a request to access the administrative page of router 302 may be received via private home network 304 from a field technician 308, who may be providing customer support on-site to an end user. Furthermore, field technician 308 may be using an authorized troubleshooting software application developed by a service provider or a manufacturer of router 302, and the authorized troubleshooting software application may be included in the list of trusted software applications.

Router 302 may determine, based on the user agent of the authorized troubleshooting software application, that the incoming request is from a trusted software application, and may generate a security measure using a programmatic challenge-response protocol, rather than using a human detection security measure. The trusted software application is programmatically capable of authorizing with router 302 without requiring any end user intervention. Such a programmatic challenge-response protocol may be a key-based programmatic challenge-response protocol, where the trusted software application used by the field technician contains an embedded key used in authenticating with router 302. The use of a programmatic challenge-response protocol eliminates the need for a human detection security measure, which saves processing time and computational resources, as well as alleviating the need for a field technician to pass a Turing test or other such human detection security measures each time the field technician provides customer support to an end user.

For example, router 302 may utilize an embedded private-key/public-key challenge-response protocol to authenticate an incoming request when the request is from a trusted software application. For purposes of the following disclosure, such an embedded private-key/public-key challenge-response protocol will simply be referred to as a "challenge-response protocol." Furthermore, it is to be appreciated that any other such challenge-response protocol may be used, such as an authentication protocol employing a cryptographic nonce.

The determination of an appropriate security measure is not dependent on a type of network used to transmit the incoming request. For example, while field technician 308 may access router 302 via home network 304, it is equally possible that a customer support technician at a customer support system 310 may desire access to router 302 for purposes of troubleshooting. Accordingly, upon receiving a request over public network 312, such as the Internet, router 302 may determine, based on the user agent of the incoming request, whether to present a human detection security measure, or to use a challenge-response protocol. Thus, in the provided example, a customer support representative at a customer support system 310 may utilize a trusted software application to provide customer support for router 302. Router 302, upon determining that an incoming request received over public network 312 originated from a trusted software application, may generate a security measure based on a challenge-response protocol.

Furthermore, the use of a challenge-response protocol is not limited to only field technicians or customer support representatives. For example, an end user 314 may be provided with a client-side software application by a service provider that provides telecommunication services to end user 314. For example, a service provider may provide end user 314 with a self-help utility software application created by the service provider, and end user 314 may use the provided utility program as a method of troubleshooting router 302 without the need for contacting a field technician or customer support representative in troubleshooting router 302. Because the utility program is created and provided by a service provider, the utility program is considered a trusted software application, and may be distributed to end user 314 with an embedded key so that the utility program can authenticate according to a challenge-response protocol. As the utility program is being distributed to end users, there is a need to protect the embedded key, which may be provided in a heavily obfuscated form so that obtaining the key by conventional key-extraction tools becomes difficult, thereby preventing use of the key for malicious purposes.

Accordingly, when end user 314 utilizes the utility program to access the administrative page of router 302, the human detection security measures may be bypassed, and router 302 may perform authentication of end user 314 using a challenge-response protocol with the embedded key in the utility program. Alternatively, router 302 may allow software applications having certain embedded keys to directly access the administrative page of the router without any additional security checks, thereby bypassing both the human detection security measures and the security measures based on a challenge-response protocol.

However, in instances where exemplary end user 306 is not using a trusted software application provided by a service provider, end user 306 may be required to respond to human detection security measures with each access request to the administrative page of router 302. As end users may disfavor having to respond to such challenges with every access, router 302 may present a human detection security measure, such as a CAPTCHA, to end user 306 upon a first access attempt to the administrative page of router 302. Upon satisfying the CAPTCHA challenge, end user 306 may be directed to an authentication web page via an end-user browser where authentication credentials may be entered, such as a user name and password, for a service associated with router 302. That is, a security measure is presented to the user, and upon satisfying the security measure, a sign-on page may be provided to the user to further enter authentication credentials. Thus, the security measure may be an additional level of security beyond the existing sign-on portion of the authentication web page.

Upon acceptance of the end user's authentication credentials, a trusted authentication system (not shown) may provide the end-user browser with a key or passphrase in a secure manner. The key or passphrase enables the end-user browser, traditionally not considered a trusted software application, to be considered by router 302 as a trusted software application and, therefore, allowed to bypass the human detection security measures typically presented to non-trusted software applications (i.e., software applications that are not trusted), and allow the end-user browser to programmatically authenticate with router 302.

Accordingly, using the received key or passphrase, exemplary end user 306 may bypass a human detection security measure, such as a CAPTCHA challenge, when attempting to access the administrative page of router 302. Furthermore, the key or passphrase provided to end user 306 may be either a permanent key, or a temporary key, where the temporary key or passphrase are capable of expiring. For example, if end user 306 does not log into the authentication web page within a predetermined time period, the temporary key or passphrase may expire. Alternatively, the temporary key or passphrase may automatically expire after the passing of a predetermined time period. In these situations, a new temporary key may be provided to end user 306 upon reauthenticating with the authentication web page.

Furthermore, it is to be understood that the present invention may be implemented in a variety of different situations, and is not limited to interactions with a router. For example, in an exemplary embodiment, a bank may distribute banking software to a computing device of a bank customer. The bank customer, upon accessing a web site associated with the bank through the banking software for the first time, may be presented a human detection security measure. Once providing the correct response to the human detection security measure, a key or passphrase may be securely issued to the banking software used by the bank customer, allowing the banking customer to bypass human detection security measures upon accessing the bank web site, instead allowing the bank web site to programmatically authenticate the banking software used by the bank customer.

Figure 4:
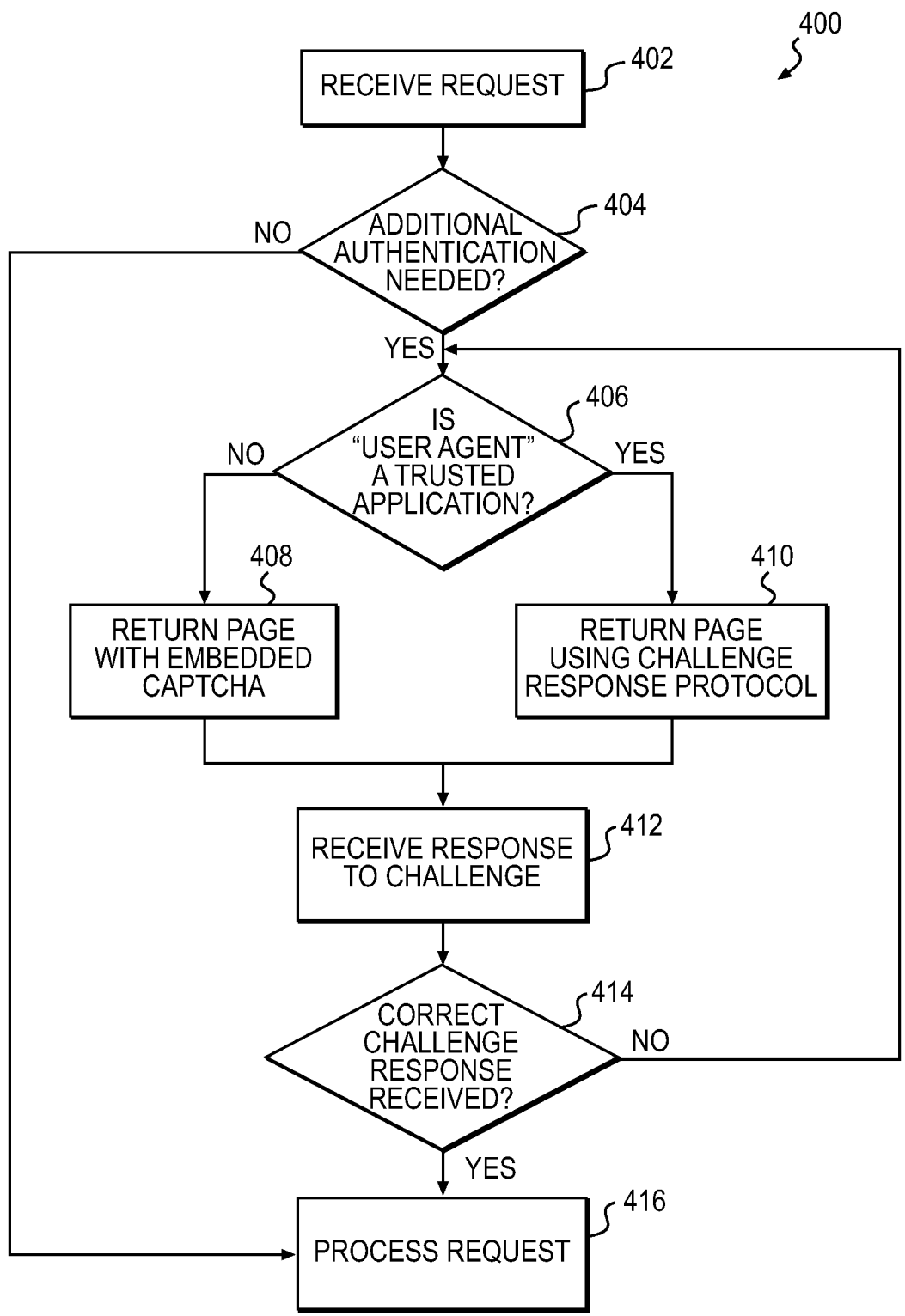
FIG. 4 is a flow diagram of an exemplary method for performing authentication in the network in accordance with certain aspects of the present disclosure.

FIG. 4. is a flow diagram of an exemplary method 400 for processing incoming requests to exemplary router 106, and will be explained with reference to FIG. 1. Using method 400, router 106 may generate security measures for defeating automated attacks or other such unauthorized access attempts in a way that combines programmatic challenge-response protocols and human detection security measures. By using programmatic challenge-response protocols for trusted software applications, router 106 may provide convenient access to field technicians or customer support representatives, who require quick and easy access to the configuration settings of the router, while still providing additional security to a router that may have a default password assigned to an administrative page of the router. Furthermore, the use of human detection security measures will defeat most automated attacks from hackers, automated bots, or other such unauthorized users who desire to gain access to router 106 for malicious purposes.

Method 400 begins at step 402, where router 106 receives an incoming request for a resource via private network 102 or public network 104. Next, in step 404, router 106 may determine whether the incoming request is from a software application or device authorized to bypass both the human detection security measures and the security measures based on a challenge-response protocol, as a result of an embedded key associated with the software application or device. Accordingly, when router 106 determines that the incoming request is already authenticated by virtue of an embedded key, router 106 may determine that no additional authentication is needed for the incoming request, and may process the incoming request. In an alternate implementation, step 404 may be used to determine whether the requested information requires authentication based on a local policy.

However, there may be instances where the incoming request is not associated with an embedded key and therefore requires additional authorization, or router 106 has been configured to require additional authorization even in the presence of an embedded key associated with the software application that issued the incoming request. Therefore, upon determining that additional authorization is required, in step 406, router 106 may determine a classification of the incoming request. Such a classification may be based on a detected user agent of the software application issuing the incoming request, and using the detected user agent, router 106 may determine whether the user agent is representative of a trusted software application.

If router 106 determines that a user agent associated with an incoming request originated from a software application that is not designated as a trusted software application, method 400 may proceed to step 408, where router 106 may generate a human detection security measure in response to the incoming request. For example, an incoming request to router 106 may request access to the administrative page of router 106, for purposes of modifying configuration settings of router 106. However, router 106 may determine that the incoming request originated from an end-user browser, based on the detected user agent of the end-user browser. As the end-user browser is not a trusted application, router 106 may generate and display, for example, a page containing an embedded CAPTCHA challenge in response to the incoming request.

Alternatively, in step 410, router 106 may determine, based on the detected user agent of the software application, that an incoming request originated from a trusted software application. For example, a field technician may be attempting to troubleshoot router 106, and is using an software application developed by the service provider associated with router 106. Accordingly, the software application being used by the field technician is a trusted software application, and router 106 may use a challenge-response protocol to perform the additional authorization needed for allowing the trusted software application to access the administrative page associated with router 106, rather than using a human detection security measure. Enabling router 106 to bypass the generation of a human detection security measure saves processing time and computational resources, and provides more convenient access for the field technician.

Next, in step 412, router 106 may receive a user's response to the human detection security measure, for example a CAPTCHA challenge, or alternatively, may receive the programmatically created response to the challenge-response protocol from the trusted software application. Then, in step 414, router 106 may determine whether the correct challenge responses have been received. For example, router will determine whether the user response to the human detection security measure is correct for authentication purposes, or alternatively will determine whether the programmatic response created according to the challenge-response protocol is correct for authentication purposes. If router 106 determines that a response is not correct, method 400 proceeds back to step 406 to present an authentication challenge to the incoming request. If, however, a response is determined to be correct, router 106 will then perform processing of the incoming request in step 416.

Figure 5:
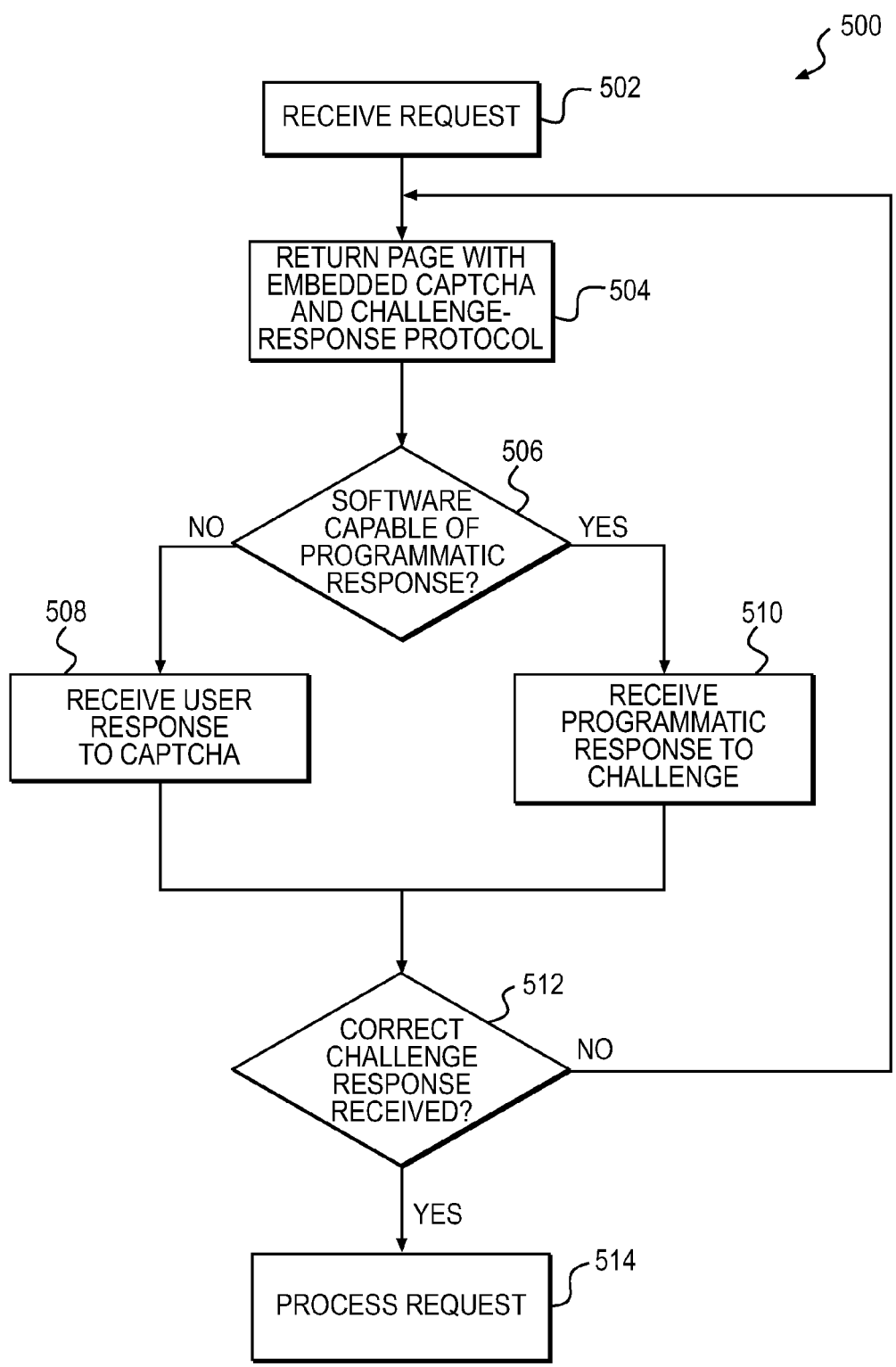
FIG. 5 is a flow diagram of another exemplary method for performing authentication in the network in accordance with certain aspects of the present disclosure.

FIG. 5. is a flow diagram of an alternate exemplary method 500 for processing incoming requests to exemplary router 106. Using method 500, router 106 may generate security measures for defeating automated attacks or other such unauthorized access attempts in a way that combines programmatic challenge-response protocols and human detection security measures. However, in method 500, the challenge-response protocols used for authorizing trusted software applications may be embedded in a common page generated for the human detection security measures, such as the CAPTCHA. Thus, router 106 is not be required to generate a new challenge page depending on the type of incoming request, and a reduction of processing time and computational resources may be achieved through the use of a single authorization page for all incoming requests.

Method 500 begins at step 502, where router 106 receives an incoming request for a resource via private network 102 or public network 104. Next, in step 504, router 106 may return data, for example a web page, responsive to the incoming request. The web page may have an embedded human detection security measure, such as a CAPTCHA, along with an embedded challenge using a challenge-response protocol. Upon receiving the web page, in step 506, the software application providing the incoming request may determine, based on the challenge-response protocols embedded in the page, whether the software application is capable of responding to the page with a programmatic response.

If the software application cannot respond to the challenge programmatically, in step 508, a user may respond to the human detection security measure, e.g. a CAPTCHA challenge. Alternatively, in step 510, the software application may determine that a programmatic response to according to the challenge-response protocol is available, and may automatically issue a programmatic response to the challenge issued according to the challenge-response protocol. Then, in step 512, router 106 may determine whether the user response to the human detection security measure is correct for authentication purposes, or alternatively may determine whether the programmatic response to the challenge issued according to the challenge-response protocol is correct for authentication purposes. If router 106 determines that a response is not correct, router 106 proceeds back to step 504, where router 106 may request authorization once more by returning data, such as a new web page, presenting an authentication challenge. If, however, a response is determined to be correct, router 106 will then perform processing of the incoming request in step 514.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include software, but systems and methods consistent with the present disclosure may be implemented as a combination of hardware and software or in hardware alone.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system or existing communications software.

Moreover, while illustrative embodiments have been described herein, the scope includes any and all embodiments having equivalent elements, modifications, omissions, combinations (e.g., of aspects across various embodiments), adaptations and/or alterations based on the present disclosure. The singular forms "a," "an," and "the" are not restrictive, and multiples of any aspect of the present disclosure may be provided unless the context dictates otherwise. The limitations in the claims are to be interpreted broadly based on the language employed in the claims and not limited to examples described in the present specification or during the prosecution of the application, which examples are to be construed as nonexclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope of equivalents.

What is claimed is:

1. A computer-implemented method comprising:
receiving a request for a network resource from a software application;
determining a classification of the request based on a detected user agent of the software application;
determining whether the detected user agent represents a trusted software application;
generating a first security measure that can be programmatically responded to when the software application is determined to be of a first classification that represents a trusted request when the detected user agent represents a trusted software application;
generating a second security measure requiring user input when the software application is determined to be of a second classification that represents a non-trusted request when the detected user agent does not represent a trusted software application; and
permitting access to the network resource when an applicable response to the security measure is received based on the determined classification of the request.

2. The method of claim 1, wherein the request for the network resource is a request for an administrative page of configuration settings of a router.

3. The method of claim 1, wherein the generated security measure corresponding to a trusted request uses a challenge-response protocol for programmatically performing authentication of the request.

4. The method of claim 3, wherein the challenge-response protocol is a key-based programmatic response.

5. The method of claim 1, wherein the generated security measure corresponding to a non-trusted request uses a Turing test for the second security measure, the second security measure being a human detection security measure.

6. The method of claim 5, further comprising:
receiving, from a user, a response to the human detection security measure;
determine whether the received response is a correct response to the human detection security measure;
presenting an authentication web page for receiving authentication credentials corresponding to the user; and
issuing a key to the software application issuing the request for the network resource, upon validating the authentication credentials, to classify the software application as a trusted software application.

7. The method of claim 6, wherein the key is a temporary key capable of expiring if the user does not access the authentication web page for a predetermined time period.

8. An apparatus comprising:
a memory device storing instructions for processing of incoming requests; and
a processor executing the instructions to perform the steps of:
receiving a request for a resource of the apparatus from a software application;
determining a classification of the request based on a detected user agent of the software application;
determining whether the detected user agent represents a trusted software application;
generating a first security measure that can be programmatically responded to when the software application is determined to be of a first classification that represents a trusted request when the detected user agent represents a trusted software application;
generating a second security measure requiring user input when the software application is determined to be of a second classification that represents a non-trusted request when the detected user agent does not represent a trusted software application; and
permitting access to the resource when an applicable response to the security measure is received based on the determined classification of the request.

9. The apparatus of claim 8, wherein the apparatus is a router, and the request for the resource is a request for an administrative page of configuration settings of the router.

10. The apparatus of claim 8, wherein the generated security measure corresponding to a trusted request uses a challenge-response protocol for programmatically performing authentication of the request.

11. The apparatus of claim 10, wherein the challenge-response protocol is a key-based programmatic response.

12. The apparatus of claim 8, wherein the generated security measure corresponding to a non-trusted request uses a Turing test for the second security measure, the second security measure being a human detection security measure.

13. The apparatus of claim 12, further comprising executing instructions to perform the steps of:
receiving, from a user, a response to the human detection security measure;
determine whether the received response is a correct response to the human detection security measure;

presenting an authentication web page for receiving authentication credentials corresponding to the user; and issuing a key to the software application issuing the request for the network resource, upon validating the authentication credentials, to classify the software application as a trusted software application.

14. The apparatus of claim 13, wherein the key is a temporary key capable of expiring if the user does not access the authentication web page for a predetermined time period.

15. A non-transitory computer-readable storage medium storing instructions which, when executed by a processor, causes a computer to perform a method, comprising:

receiving a request for a network resource from a software application;

determining a classification of the request based on a detected user agent of the software application;

determining whether the detected user agent represents a trusted software application;

generating a first security measure that can be programmatically responded to when the software application is determined to be of a first classification that represents a trusted request when the detected user agent represents a trusted software application;

generating a second security measure requiring user input when the software application is determined to be of a second classification that represents a non-trusted request when the detected user agent does not represent a trusted software application; and permitting access to the network resource when an applicable response to the security measure is received based on the determined classification of the request.

16. The computer-readable storage medium of claim 15, wherein the request for the network resource is a request for an administrative page of configuration settings of a router.

17. The computer-readable storage medium of claim 15, wherein the generated security measure corresponding to a trusted request uses a challenge-response protocol for programmatically performing authentication of the request.

18. The computer-readable storage medium of claim 17, wherein the challenge-response protocol is a key-based programmatic response.

19. The computer-readable storage medium of claim 15, wherein the generated security measure corresponding to a non-trusted request uses a Turing test for the second security measure, the second security measure being a human detection security measure.

20. The computer-readable storage medium of claim 19, further comprising:

receiving, from a user, a response to the human detection security measure;

determine whether the received response is a correct response to the human detection security measure;

presenting an authentication web page for receiving authentication credentials corresponding to the user; and issuing a key to the software application issuing the request for the network resource, upon validating the authentication credentials, to classify the software application as a trusted software application.

21. The computer-readable storage medium of claim 20, wherein the key is a temporary key capable of expiring if the user does not access the authentication web page for a predetermined time period.

* * * * *